United States Patent
Chen et al.

(10) Patent No.: US 9,464,471 B1
(45) Date of Patent: Oct. 11, 2016

(54) DUAL SHAFT HINGE DEVICE

(71) Applicant: LIANHONG ART CO., LTD., Taoyuan (TW)

(72) Inventors: Chia-Hui Chen, Taoyuan (TW); Tzu-Yu Lin, Taoyuan (TW); Yen-Ting Chen, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 0 days.

(21) Appl. No.: 14/982,006

(22) Filed: Dec. 29, 2015

(30) Foreign Application Priority Data

Nov. 30, 2015 (TW) .............................. 104219180 U

(51) Int. Cl.
*E05D 3/12* (2006.01)
*G06F 1/16* (2006.01)

(52) U.S. Cl.
CPC ............ *E05D 3/122* (2013.01); *G06F 1/1681* (2013.01); *Y10T 16/541* (2015.01)

(58) Field of Classification Search
CPC ........... Y10T 16/541; Y10T 16/54038; Y10T 16/547; Y10T 16/5474; E05D 3/06; E05D 3/12; E05D 3/122; E05D 11/087; G06F 1/1618; G06F 1/1681; H04M 1/022; H05K 5/0226; F16H 19/08; E05Y 2900/606
USPC ............. 16/354, 342, 366, 368; 379/433.13; 361/679.27; 455/575.3
See application file for complete search history.

(56) References Cited

U.S. PATENT DOCUMENTS

| 9,127,490 | B2 | 9/2015 | Chen et al. | |
| 9,309,705 | B2* | 4/2016 | Hsu | G06F 1/1681 |
| 9,310,849 | B2* | 4/2016 | Hsu | E05D 3/00 |
| 2015/0047152 | A1* | 2/2015 | Cheng | E05D 3/122 16/354 |
| 2015/0159413 | A1* | 6/2015 | Chen | E05D 3/122 16/342 |
| 2015/0267450 | A1* | 9/2015 | Chiang | G06F 1/1681 16/354 |
| 2015/0342068 | A1* | 11/2015 | Su | G06F 1/1681 16/354 |
| 2016/0010374 | A1* | 1/2016 | Hsu | G06F 1/16 74/414 |

* cited by examiner

*Primary Examiner* — William Miller
(74) *Attorney, Agent, or Firm* — Guice Patents PLLC

(57) ABSTRACT

A dual shaft hinge device includes a first shaft including a first expansion portion; a second shaft including a second expansion portion; a pair of securing plates joined to the first shaft and the second shaft respectively and connected to a display device and a main body of an electronic device respectively; torque elements connected to the first shaft and the second shaft; a limiting mechanism connected to the first shaft and the second shaft; a first helical gear formed on the first expansion portion; a second helical gear formed on the second expansion portion; a base including two through holes for the first shaft and the second shaft extending therethrough, two extending plates separated by a distance, two transverse through holes formed on the extending plates and two depressed portions formed on a back side of the base; and a middle gear rotatably disposed between the extending plates and engaging the first helical gear and the second helical gear.

2 Claims, 4 Drawing Sheets

DUAL SHAFT HINGE DEVICE

BACKGROUND OF THE INVENTION

1. Field of the Invention

The invention relates to a hinge device with two synchronous shafts and reinforced structure.

2. Description of the Related Art

A conventional laptop has a display device and a main body. The display device can be separated from the main body. The separated display device can be used individually. In addition, another conventional laptop has a display device which is rotatable with respect to the main body through a dual shaft hinge device and can be positioned at any angle. The display device can be even rotated 360° to overlap the main body and thus operated as a tablet.

Since the conventional dual shaft hinge has s complicated structure for both the display device and the main body, the cost and labor for manufacturing may increase, and the rotation of the display device through such conventional dual shaft hinge may unsmooth or inconvenient. U.S. Pat. No. 9,127,490 discloses a transmission mechanism for a dual shaft hinge. The transmission mechanism includes two shafts rotated synchronously in opposite directions through a gear set, which causes smooth rotation for opening or closing the display device and can be mounted in a small space for compact devices.

As the laptop is more and more compact, the gear set becomes very small and thus has a weaker structure for the rotational force.

BRIEF SUMMARY OF THE INVENTION

The invention provides a dual shaft hinge device. The dual shaft hinge device in accordance with an exemplary embodiment of the invention includes a first shaft including a first expansion portion; a second shaft including a second expansion portion; a pair of securing plates joined to the first shaft and the second shaft respectively and connected to a display device and a main body of an electronic device respectively; torque elements connected to the first shaft and the second shaft; a limiting mechanism connected to the first shaft and the second shaft; a first helical gear formed on the first expansion portion; a second helical gear formed on the second expansion portion; a base including two through holes for the first shaft and the second shaft extending therethrough, two extending plates separated by a distance, two transverse through holes formed on the extending plates and two depressed portions formed on a back side of the base; and a middle gear rotatably disposed between the extending plates and engaging the first helical gear and the second helical gear.

In another exemplary embodiment, the base further including an extending portion disposed between the through holes for a protective cover mounted thereon, the protective cover covers the torque elements and the limiting mechanism.

In yet another exemplary embodiment, the dual shaft hinge device further includes a connecting plate, wherein the first shaft further includes a first neck portion formed on the first expansion portion, the second shaft includes a second neck portion formed on the second expansion portion, and the connecting plate disposed between the first shaft and the second shaft connects the first neck portion and the second neck portion.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
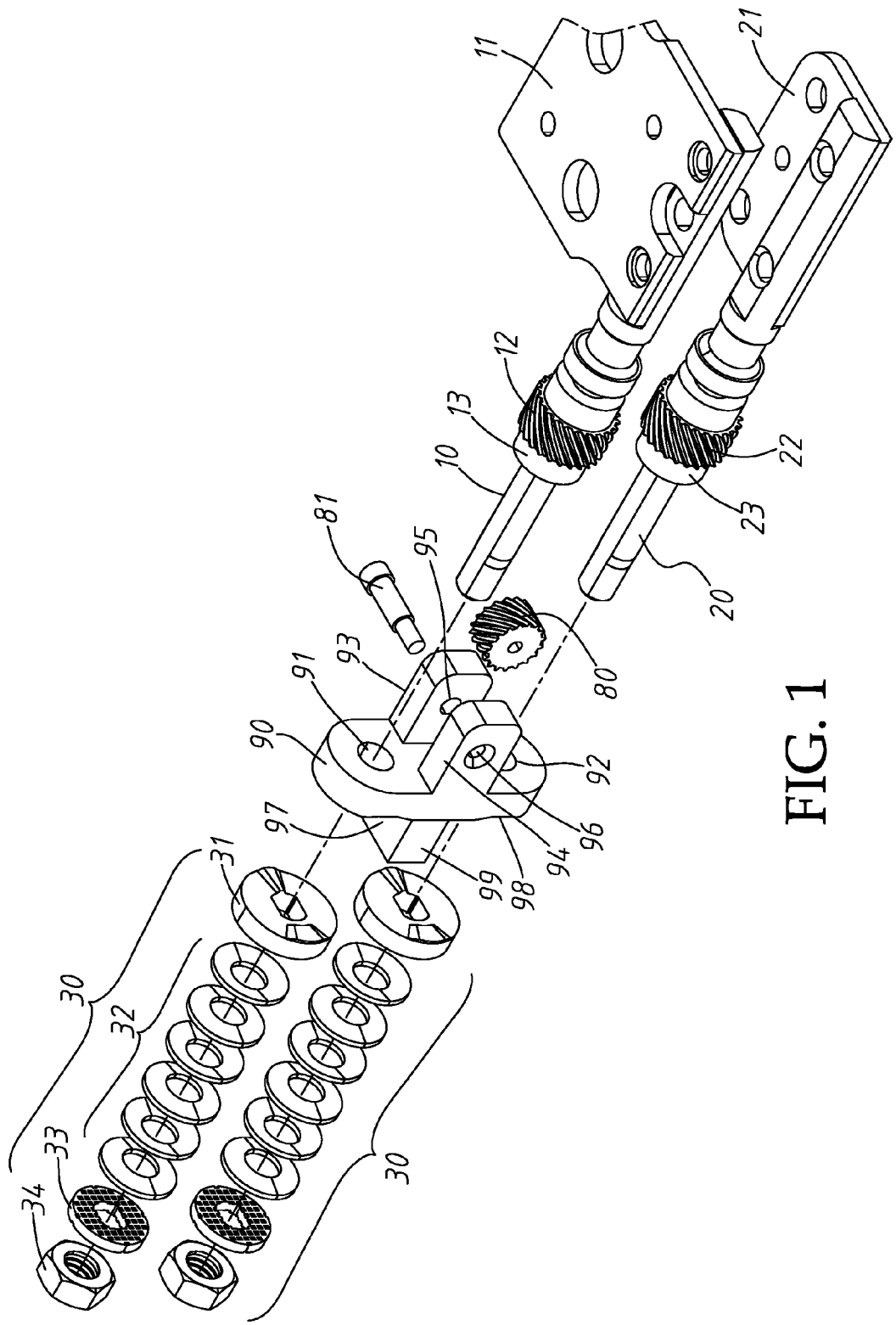
FIG. 1 is an exploded view of an embodiment of a dual shaft hinge device of the invention.
Figure 2:
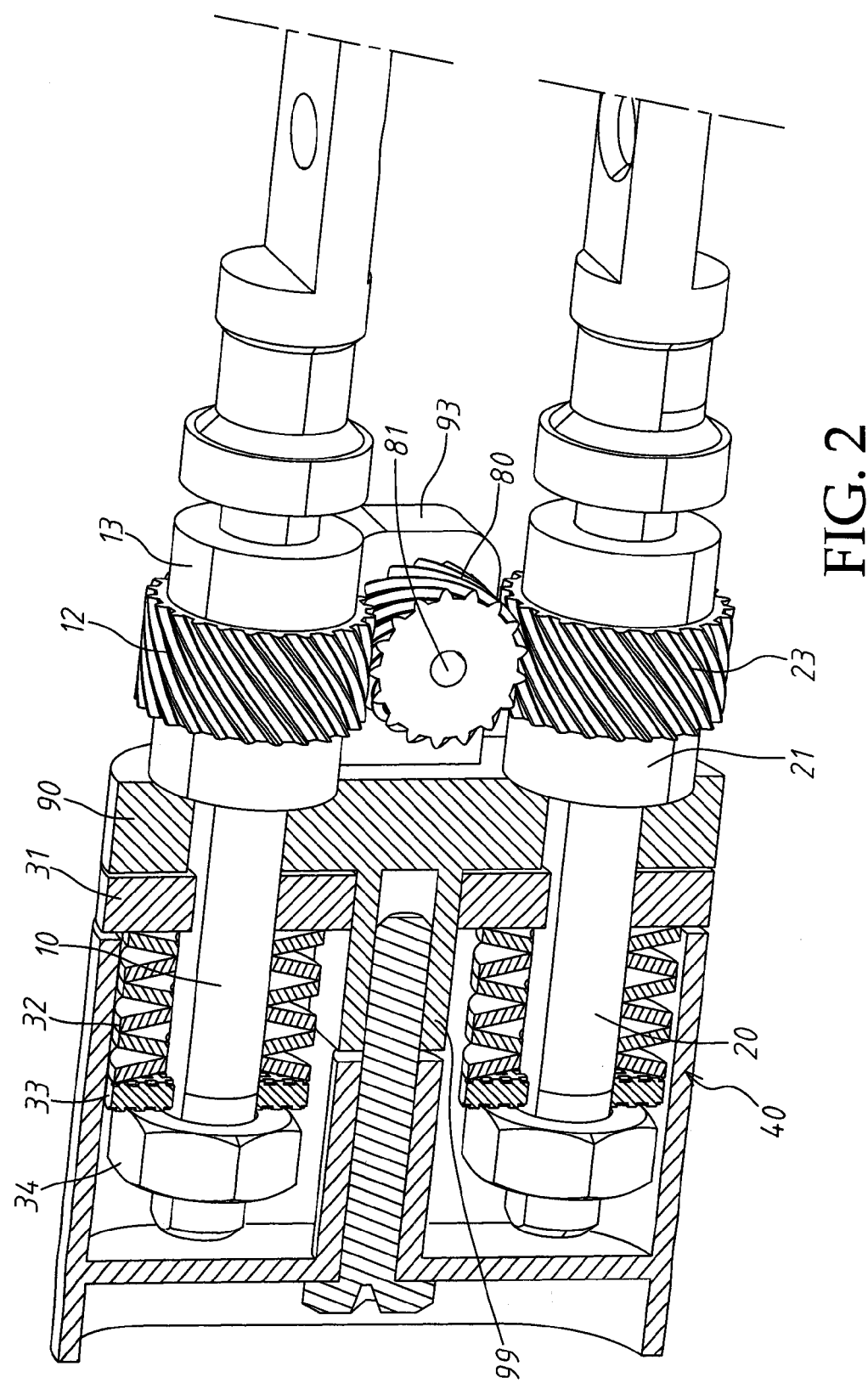
FIG. 2 is a perspective and partial cross-sectional view of FIG. 1.

Referring to FIGS. 1 and 2, a dual shaft hinge device of the invention includes a first shaft 10 and a second shaft 20. A pair of securing plates 11 and 21 are joined to one end of the first shaft 10 and the second shaft 20 individually. The securing plates 11 and 21 are also mounted to a display device and a main body of an electronic device such as a laptop respectively. The other ends of the first shaft 10 and the second shaft 20 are connected to torque elements and limiting mechanisms 30 including wheels 31, elastic pads 32, movable plates 33 and nuts 34 to constitute a dual shaft hinge device.

The first shaft 10 includes a first expansion portion 13, and the second shaft 20 includes a second expansion portion 23. A first helical gear 12 is formed on the first expansion portion 13, and a second helical gear 22 is formed on the second expansion 23.

A base 90 includes two through holes 91 and 92 for the first shaft 10 and the second shaft 20 extending therethrough. The base 90 further includes two extending plates 93 and 94 separated by a distance. Two transverse through holes 95 and 96 are formed on the extending plates 93 and 94 respectively. Two depressions 97 and 98 receiving wheels 31 are formed on a back side of the base 90. In this embodiment, an extending portion 99 is disposed between the extending plates 95 and 96 for a protective cover 40 mounted thereon. The protective cover 40 protects the torque elements and the limiting mechanism 30.

A middle gear 80 is disposed between the extending plates 93 and 94 and rotatable about a pin 81 extending through the transverse through holes 95 and 96. The middle gear 80 engages the first helical gear 12 and the second helical gear 22.

Figure 3:
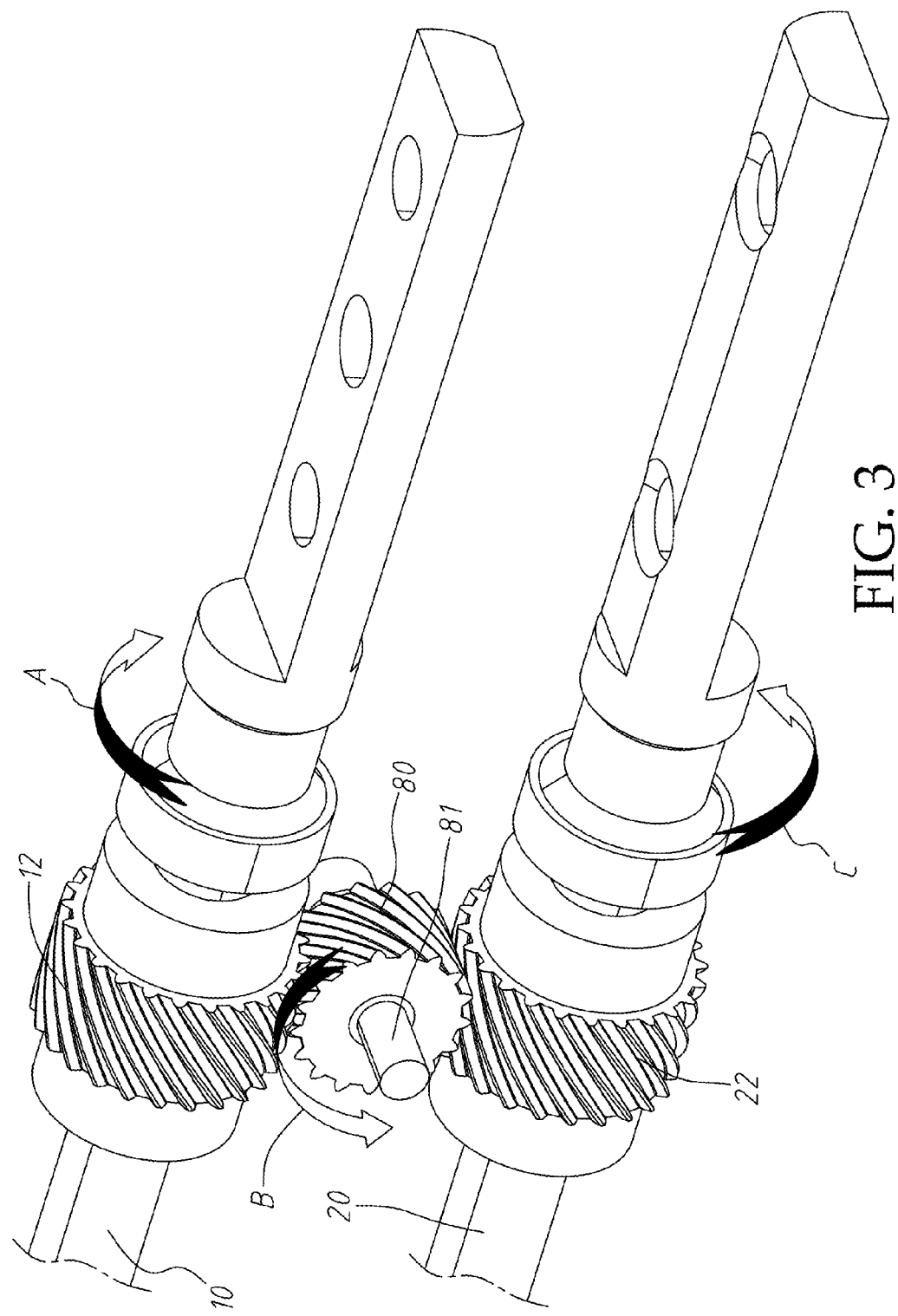
FIG. 3 depicts rotation of the dual shaft hinge device of the invention of FIG. 1.

Referring to FIG. 3, when the display device of the laptop is rotated with respect to the main body, the first shaft 10 is rotated along with the second shaft 20. When the first shaft 10 rotates in a direction A as shown in FIG. 3, the helical gear 12 is rotated along with the first shaft 10, the middle gear 80 engaging the first helical gear 10 is rotated by the first helical gear 12 in a direction B, and the second helical gear 22 engaging the middle gear 80 rotates in a direction C opposite to the direction A. Thus, the second shaft 20 rotates in a direction opposite to the first shaft 10. The elastic pads 32 along with the movable plates 33 and the wheel 31 generates axial torque through the rotation of the first shaft 10 and the second shaft 20 to limit the first shaft 10 and the second shaft 20 with the aid of the wheel 31 and the depressions 97 and 98.

Figure 4:
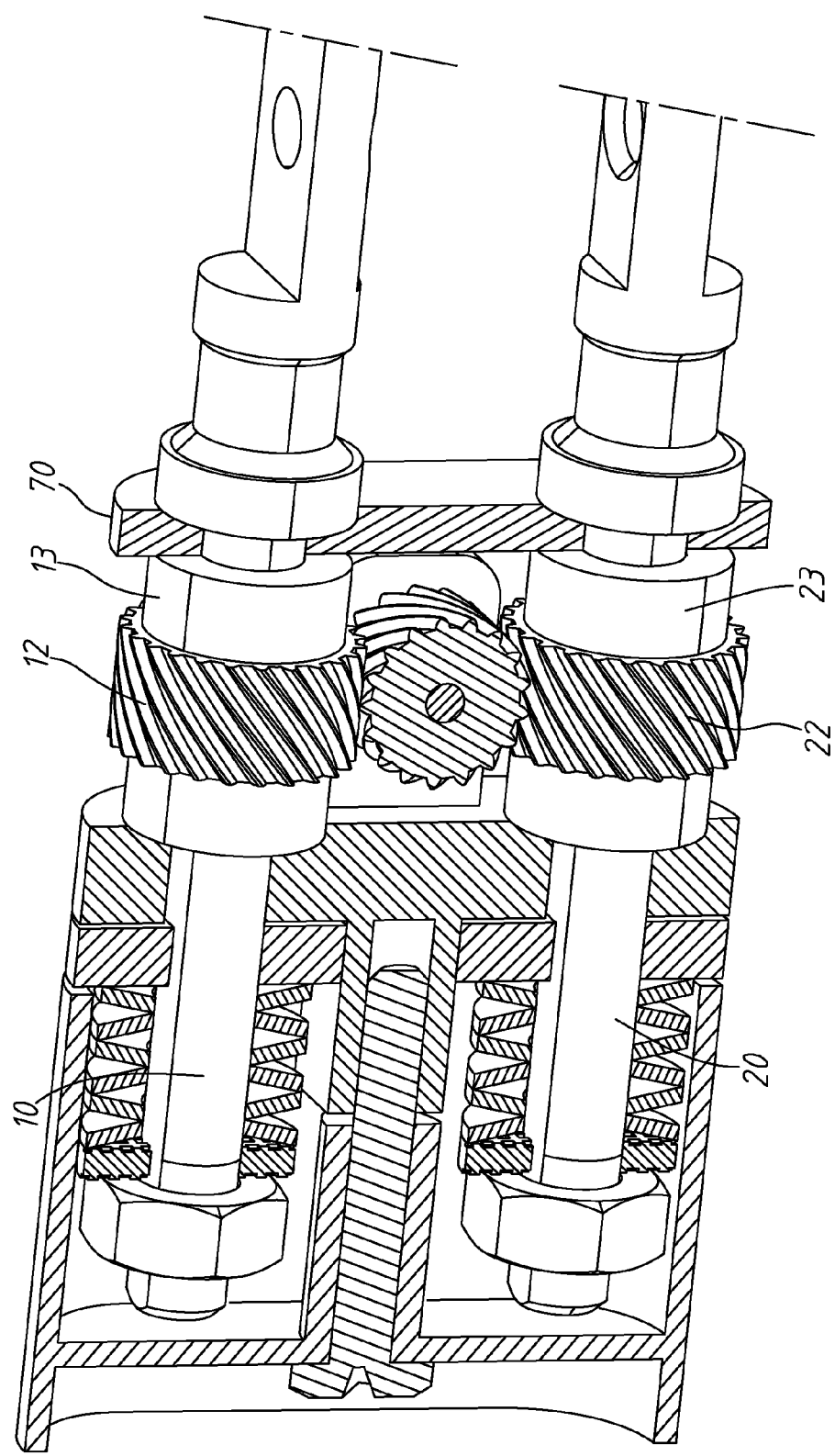
FIG. 4 depicts another embodiment of a dual shaft hinge device of the invention.

FIG. 4 depicts another embodiment of a dual shaft hinge device. In this embodiment, the first shaft 10 further includes a first neck portion formed on the first expansion portion 13, and the second shaft 20 further includes a second neck portion formed on the second expansion portion 23. The dual shaft hinge device further includes a connecting plate 70 disposed between the first shaft 10 and the second shaft 20 connects the first neck portion and the second neck portion.

The first shaft 10 and the second shaft 20 of the dual shaft hinge device of the invention rotate in opposite directions through the first helical gear 12, the second helical gear 22 and the middle gear 80 so that the display device rotates with respect to the main body of the electronic device smoothly. Even though the first helical gear 12 and the second helical gear 22 become smaller when they are applied to a compact mechanism, the first helical gear 12 and the second helical gear 22 still have enough strength because the first helical gear 12 and the second helical gear 22 are integrated with the first shaft 10 and the second shaft 20.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual shaft hinge device for an electronic device comprising a display device and a main body, comprising:
   a first shaft comprising a first expansion portion;
   a second shaft comprising a second expansion portion;
   a pair of securing plates joined to the first shaft and the second shaft respectively and connected to the display device and the main body respectively;
   a first helical gear formed on the first expansion portion;
   a second helical gear formed on the second expansion portion;
   a base comprising two through holes for the first shaft and the second shaft extending therethrough, two extending plates formed on a front side of the base and separated by a distance, two aligned transverse through holes formed on the extending plates and two depressed portions formed on a back side of the base;
   a middle gear disposed between the extending plates and engaging the first helical gear and the second helical gear, the middle gear being rotatable about a pin extending through the two aligned transverse through holes; and
   a plurality of torque elements connected to the first shaft and the second shaft, respectfully, which generate an axial torque through the rotation of the first shaft and the second shaft, and wherein one of the plurality of torque elements engages the respective depressed portion formed on the back side of the base to limit rotation of the first shaft and the second shaft;
   wherein the base further comprising an extending portion disposed between the through holes for a protective cover mounted thereon, the protective cover covers the plurality of torque elements.

2. The dual shaft hinge device as claimed in claim 1 further comprising a connecting plate, wherein the first shaft further comprises a first neck portion formed on the first expansion portion, the second shaft comprises a second neck portion formed on the second expansion portion, and the connecting plate disposed between the first shaft and the second shaft connects the first neck portion and the second neck portion.

* * * * *